US009998229B2

(12) United States Patent
Rahn et al.

(10) Patent No.: US 9,998,229 B2
(45) Date of Patent: Jun. 12, 2018

(54) OPTIMIZED STAR-8QAM PERFORMANCE FOR BINARY ENCODING

(71) Applicant: Infinera Corporation, Annapolis Junction, MD (US)

(72) Inventors: Jeffrey T. Rahn, Sunnyvale, CA (US); Han Henry Sun, Ottawa (CA)

(*) Notice: Subject to any disclaimer, the term of this patent is extended or adjusted under 35 U.S.C. 154(b) by 0 days. days.

(21) Appl. No.: 14/986,530

(22) Filed: Dec. 31, 2015

(65) Prior Publication Data

US 2017/0195059 A1  Jul. 6, 2017

(51) Int. Cl.
*H04B 10/516* (2013.01)

(52) U.S. Cl.
CPC .................... *H04B 10/516* (2013.01)

(58) Field of Classification Search
CPC ............. H04B 10/516; H04B 10/548–10/5561
See application file for complete search history.

(56) References Cited

U.S. PATENT DOCUMENTS

| | | | | |
|---|---|---|---|---|
| 8,675,754 B1* | 3/2014 | Yonge, III | ............ | H04L 27/183 375/261 |
| 2011/0318017 A1* | 12/2011 | Sun | ...................... | H04B 10/611 398/154 |
| 2014/0133589 A1 | 5/2014 | Ouchi et al. | | |
| 2014/0369680 A1* | 12/2014 | Oveis Gharan | ....... | H04L 1/0042 398/27 |

* cited by examiner

*Primary Examiner* — David Payne
*Assistant Examiner* — Casey Kretzer

(57) ABSTRACT

Consistent with an aspect of the present disclosure, optical signals are transmitted that are modulated in accordance with an 8QAM modulation format. The optical signals carry symbols of data and may be represented by a constellation in the IQ plane that includes four inner points that are symmetrically arranged about the origin, and four outer points that are uniformly distributed about the origin, but rotated relative to the inner points. The rotation is toward inner points that represent symbols for which an erroneous transition between the outer points and such inner points is more likely to result in a single bit error, instead of two bit errors, because the symbol corresponding to the outer point and the symbol corresponding to such inner point differ by just one bit. Accordingly, a binary forward error correction algorithm may be employed to correct the errored bit. Such binary forward error correction operates with greater efficiency compared to symbol-wise error correction and thus additional noise can be tolerated by the optical receiver.

14 Claims, 8 Drawing Sheets

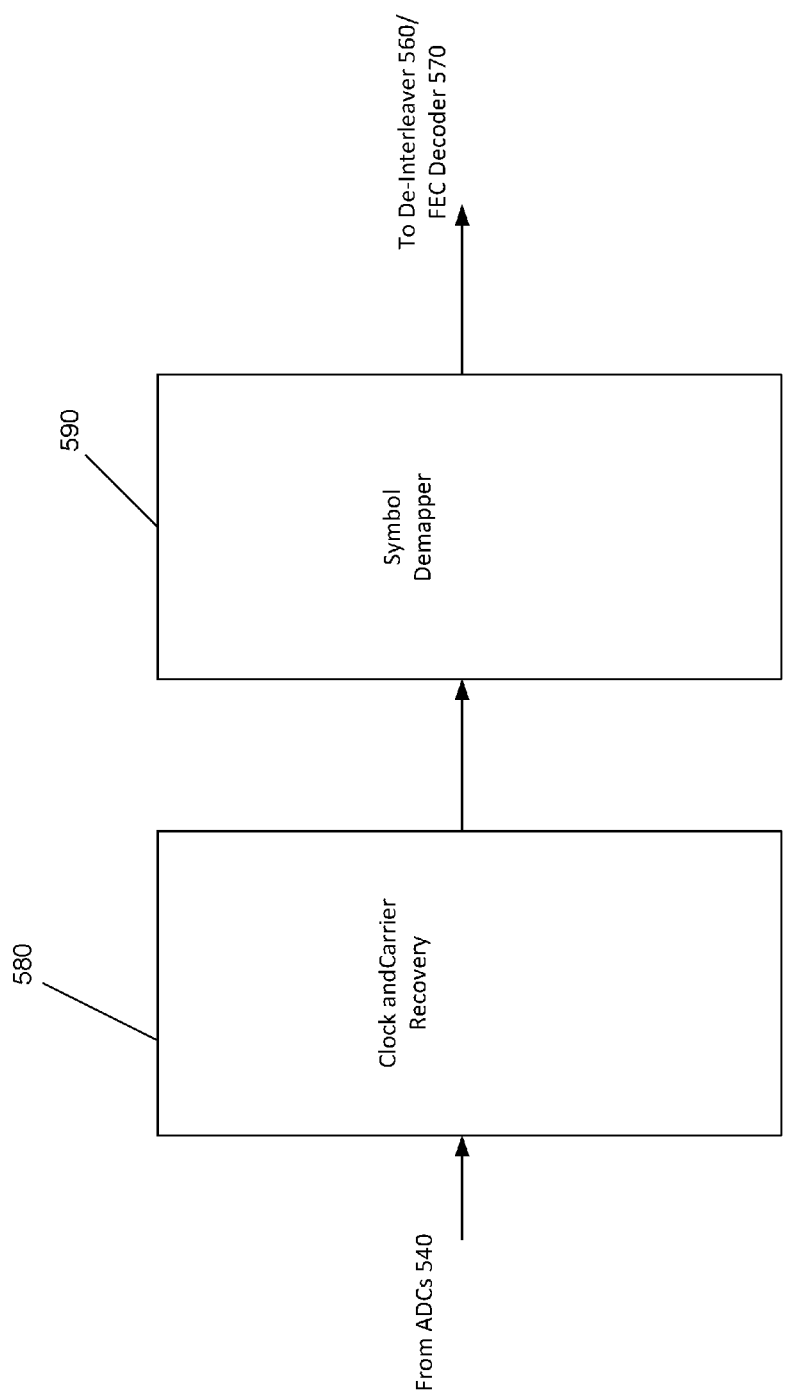

OPTIMIZED STAR-8QAM PERFORMANCE FOR BINARY ENCODING

BACKGROUND

Optical communications are known in which optical signals are modulated in accordance with various Quadrature Amplitude Modulation (QAM) formats, in which the amplitude and phase of the optical signals are modulated to carry data. In accordance with such QAM modulation formats, multi-bit sequences or symbols are represented as a particular combination of phase and amplitude of an optical signal at a given instant in time. The symbols may be represented as a constellation of points in a so-called "IQ plane." 8QAM may refer to a known class of QAM formats in which three bit sequences or symbols are carried by an optical signal. The symbols may be represented by a eight points arranged in a variety of constellations. One such constellation is a so-called star-8QAM constellation in which four inner point that are closer to the origin of the IQ plan are surrounded by four outer points, such that each outer point is equidistant to the two inner points that are closest to it.

In the star-8QAM constellation, however, an erroneous transition, instead of to the intended outer point, is equally likely to either one of the nearest inner points. Typically, the symbol associated with one of the inner points has two bits that differ from the non-errored outer point. Such "two-bit errors" increase the bit error rate (BER) of optical signals which have been modulated in accordance with a star-8 QAM constellation.

SUMMARY

Consistent with an aspect of the present disclosure, an apparatus is provided that comprises a forward error correction encoder that receives first data and outputs encoded second data and a mapper circuit. The mapper circuit that receives the encoded second data and outputs mapping signals representing constellation points in a space, each of the constellation points representing a respective one of a plurality of phase and amplitude combinations of an optical signal. The constellation points include first, second, and third constellation points. A first Euclidean distance separates the first constellation point and the second constellation point, and a second Euclidean distance separates the first constellation point from the third constellation point, the first Euclidean distance being less than the second Euclidean distance. The first and second Euclidean distances being less than Euclidean distances that separate the first constellation point from each of a corresponding one of remaining constellation points other than the second and third constellation points. The first, second, and third constellation points correspond to first, second, and third sequences of bits, respectively, such that the first sequence of bits differs from the second sequence of bits by a single bit, and the first sequence of bits differs from the third sequence of bits by at least two bits. A bit error rate associated with the optical signal is less than a bit error rate of the optical signal if the first and second Euclidean distances are equal to one another.

Consistent with an additional aspect of the present disclosure, an apparatus is provided that comprises an optical receiver circuit that receives an optical signal, which carries data, and a processor circuit coupled to the optical receiver circuit that outputs information associated with the data. The optical signal is modulated such that the data is represented by constellation points in a space, each of the constellation points corresponding to a respective one of a plurality of phase and amplitude combinations of an optical signal. The constellation points include first, second, and third constellation points. A first Euclidean distance separates the first constellation point and the second constellation point, and a second Euclidean distance separates the first constellation point from the third constellation point, the first Euclidean distance being less than the second Euclidean distance. The first and second Euclidean distances being less than Euclidean distances that separate the first constellation point from each of a corresponding one of remaining constellation points other than the second and third constellation points. The first, second, and third constellation points correspond to first, second, and third sequences of bits, respectively, such that the first sequence of bits differs from the second sequence of bits by a single bit, and the first sequence of bits differs from the third sequence of bits by at least two bits. A bit error rate associated with the optical signal is less than a bit error rate of the optical signal if the first and second Euclidean distances are equal to one another.

Further, consistent with the present disclosure, an apparatus is provided that comprises an optical transmitter that transmits an optical signal, and an optical receiver that receives the optical signal, which is modulated by circuitry in the optical transmitter such that data carried by the optical signal is represented by constellation points on an IQ plane. Each of the constellation points corresponds to a respective one of a plurality of phase and amplitude combinations of an optical signal. The constellation points include first, second, and third constellation points. A first Euclidean distance separates the first constellation point and the second constellation point, and a second Euclidean distance separates the first constellation point from the third constellation point, the first Euclidean distance being less than the second Euclidean distance. The first and second Euclidean distances being less than Euclidean distances that separate the first constellation point from each of a corresponding one of remaining constellation points other than the second and third constellation points. The first, second, and third constellation points correspond to first, second, and third sequences of bits, respectively, such that the first sequence of bits differs from the second sequence of bits by a single bit, and the first sequence of bits differs from the third sequence of bits by at least two bits. A bit error rate associated with the optical signal is less than a bit error rate of the optical signal if the first and second Euclidean distances are equal to one another.

It is to be understood that both the foregoing general description and the following detailed description are exemplary and explanatory only and are not restrictive of the invention, as claimed.

The accompanying drawings, which are incorporated in and constitute a part of this specification, illustrate various embodiments and together with the description, serve to explain the principles of the invention.

BRIEF DESCRIPTION OF THE DRAWINGS

FIG. 5 is a diagram illustrating example components of a receiver digital signal processor;

DESCRIPTION OF THE EMBODIMENTS

Consistent with an aspect of the present disclosure, optical signals are transmitted that are modulated in accordance with an 8QAM modulation format, for example. The optical signals carry symbols of data and may be represented by a constellation in the IQ plane that includes four inner points that are symmetrically arranged about the origin, and four outer points that are uniformly distributed about the origin, but rotated relative to the inner points. The rotation is toward inner points that represent symbols for which an erroneous transition between the outer points and such inner points is more likely to result in a single bit error, instead of two bit errors, because the symbol corresponding to the outer point and the symbol corresponding to such inner point differ by just one bit. Accordingly, a binary forward error correction algorithm may be employed to correct the errored bit. Such binary forward error correction operates with greater efficiency compared to symbol-wise error correction and thus additional noise can be tolerated by the optical receiver.

Reference will now be made in detail to the present embodiments of the present disclosure, examples of which are illustrated in the accompanying drawings. Wherever possible, the same reference numbers will be used throughout the drawings to refer to the same or like parts.

Figure 1:
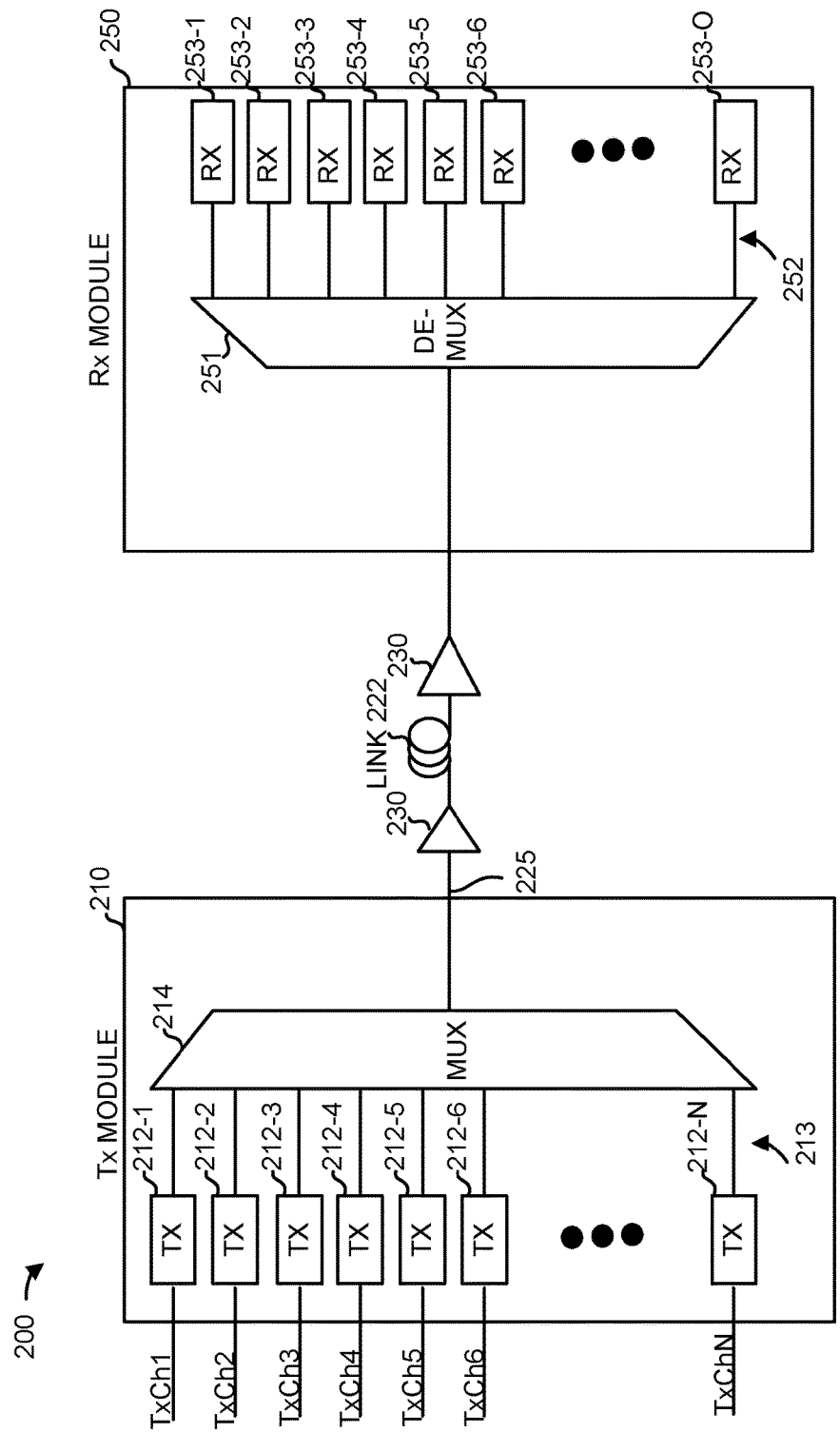
FIG. 1 is a diagram of an example network in which systems and/or methods, described herein, may be implemented.

FIG. 1 is a diagram of an example network 200 in which systems and/or methods, described herein, may be implemented. As illustrated in FIG. 1, network 200 may include transmitter (Tx) module 210 (e.g., a Tx PIC) and/or receiver (Rx) module 250 (e.g., an Rx PIC). In some implementations, transmitter module 210 may be optically connected to receiver module 250 via link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (where N≥1), waveguides 213, and/or optical multiplexer 214. Each optical transmitter 212 may receive a data channel (TxCh1 through TxChN), modulate the data channel with an optical signal, and transmit the data channel as an optical signal. In one implementation, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

In some implementations, each of optical transmitters 212 may include a laser, a modulator, a semiconductor optical amplifier (SOA), a digital signal processor (DSP), and/or some other component. The laser, modulator, and/or SOA may be coupled with a tuning element (e.g., a heater) that can be used to tune the wavelength of an optical signal channel output by the laser, modulator, or SOA. In some implementations, a single laser may be shared by multiple optical transmitters 212.

Waveguides 213 may include an optical link to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 1, receiver module 250 may include optical demultiplexer 251, waveguides 252, and/or optical receivers 253-1 through 253-O (where O≥1). In some implementations, optical demultiplexer 251 may include an AWG or some other demultiplexing device. Optical demultiplexer 251 may supply multiple signal channels based on a received WDM signal (e.g., optical signal 225). As shown in FIG. 1, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be birefringent (e.g., based on the width of waveguides 252).

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator (e.g., a laser), convert the signals to a photocurrent, and provide a voltage output to function as an electrical signal representation of the original input signal.

Figure 2:
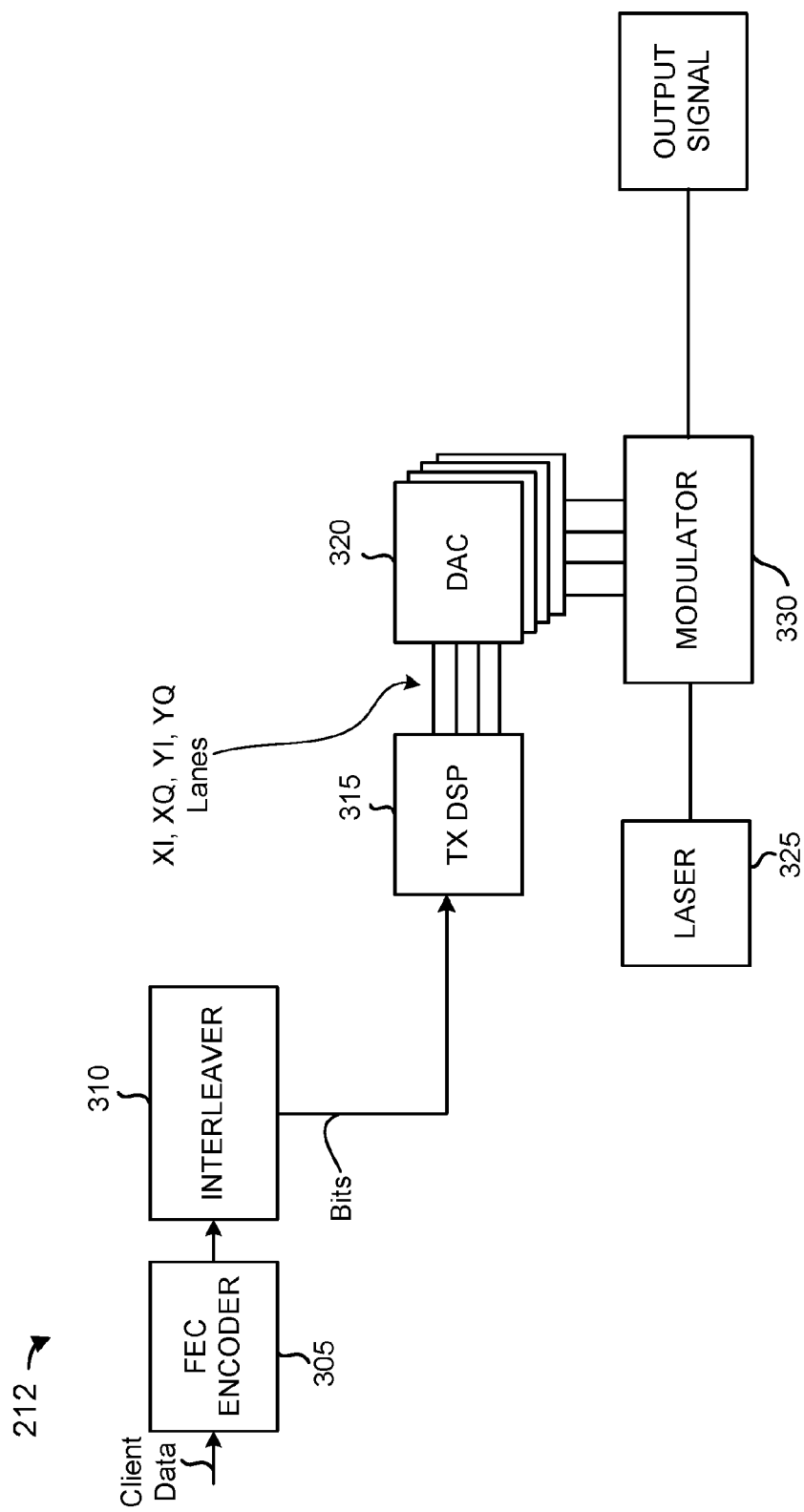
FIG. 2 is a diagram illustrating example components of an optical transmitter as shown in FIG. 1.

While FIG. 1 shows a particular configuration of components in network 200, in practice, network 200 may include additional components, different components, or differently arranged components than what are shown in FIG. 2.

FIG. 2 is a diagram illustrating example elements of optical transmitter 212 as shown in network 200 of FIG. 1. As shown in FIG. 2, optical transmitter 212 may include forward error correction (FEC) encoder 305, interleaver 310, TX digital signal processor (DSP) 315, digital-to-analog converters (DACs) 320, laser 325, and/or modulator 330. In some implementations, components of multiple optical transmitters 212 may be implemented on a single integrated circuit, such as a single PIC, to form a super-channel transmitter.

FEC encoder 305 may include a digital encoding device, or a collection of digital encoding devices. In some implementations, FEC encoder 305 may receive client data, and may encode bits, associated with the client data, to control or reduce errors in the transmission of the bits. In some implementations, FEC encoder 305 may encode the bits using a block code, a convolution code, and/or some other code or technique. As described in greater detail below with respect to FIG. 4, the bits may be decoded by an FEC decoder.

Interleaver 310 may include a bit shuffling component that receives bits from FEC encoder 305 and shuffles the bits, such that, in conjunction with a de-interleaver in optical receiver 253, the effect may spread out and prevent multiple bits that may have errors from being grouped together (e.g., as described in greater detail below with respect to FIG. 4). In some implementations, interleaver 310 may optionally be provided group the bits in groups of four and provide the grouped bits to TX DSP 315.

TX DSP 315 may include a digital signal processor or a collection of digital signal processors. In some implementations, TX DSP 315 may receive a signal (e.g., corresponding to grouped bits from interleaver 310), process the signal, and output digital signals having symbols that represent components of the signal (e.g., an in-phase x-pol (XI) component, a quadrature (quad)-phase x-pol (XQ) component, an in-phase y-pol (YI) component, and a quadrature y-pol (YQ) component). In some implementations, TX DSP 315 may output the symbols across XI, XQ, YI, and YQ lanes. In some implementations, TX DSP 315 may digitally modulate the signal by mapping bits, associated with the signal, to the symbols (e.g., using a Hamming encoder). Typically, TX DSP 315 may digitally modulate the signal using an 8QAM modulation format or higher order QAM modulation format. In some implementations, TX DSP 315 may apply spectral shaping and/or perform filtering to the signal. Additional details regarding the operations of TX DSP 315 are described with respect to FIG. 3.

Digital-to-analog converters (DACs) 320 may include a signal converting device or a collection of signal converting devices. In some implementations, DACs 320 may receive respective digital signals from TX DSP 315, convert the received digital signals to analog signals, and provide the analog signals to modulator 330. The analog signals may correspond to electrical signals (e.g., voltages) to drive modulator 330.

Laser 325 may include a semiconductor laser, such as a distributed feedback (DFB) laser, or some other type of laser. Laser 325 may provide an optical signal to modulator 330. In some implementations, laser 325 may be an optical source for a single corresponding optical transmitter 212.

Modulator 330 may include an optical modulator, such as an electro-absorption modulator (EAM), a pair of nested Mach-Zehnder modulators (MZMs) for each polarization, or some other type of modulator. Modulator 330 may control (modulate) the intensity, amplitude, and/or phase of an optical signal (e.g., supplied by laser 325) in order to convey data associated with the data source (e.g., via one or more optical carriers of the optical signal). For example, modulator 330 may modulate the input optical light (e.g., from laser 325) based on an input voltage signal associated with the data source (e.g., an input voltage provided by DACs 320) to form an output signal. As described below with respect to FIG. 5, the output signal may be provided to optical receiver 253 such that optical receiver 253 may compare the intensity, amplitude, and/or phase of the output signal to a reference signal in order to recover data carried by the output signal.

Modulator 330 may be formed as a waveguide with electrodes for applying an electric field, based on the input voltage signal, in a direction perpendicular to the output signal output by laser 325. Alternatively, modulator 330 may be implemented based on other modulation technologies, such as electro-optic modulation.

In some implementations, multiple modulators 330 may be provided to modulate signals associated with particular components. For example, a first modulator 330 may be provided to modulate an in-phase x-pol component, a second modulator 330 may be provided to modulate a quadrature x-pol component, a third modulator 330 may be provided to modulate an in-phase y-pol component, and a fourth modulator 330 may be provided to modulate a quadrature y-pol component.

While FIG. 2 shows optical transmitter 212 as including a particular quantity and arrangement of components, in some implementations, optical transmitter 212 may include additional components, fewer components, different components, or differently arranged components.

Figure 3:
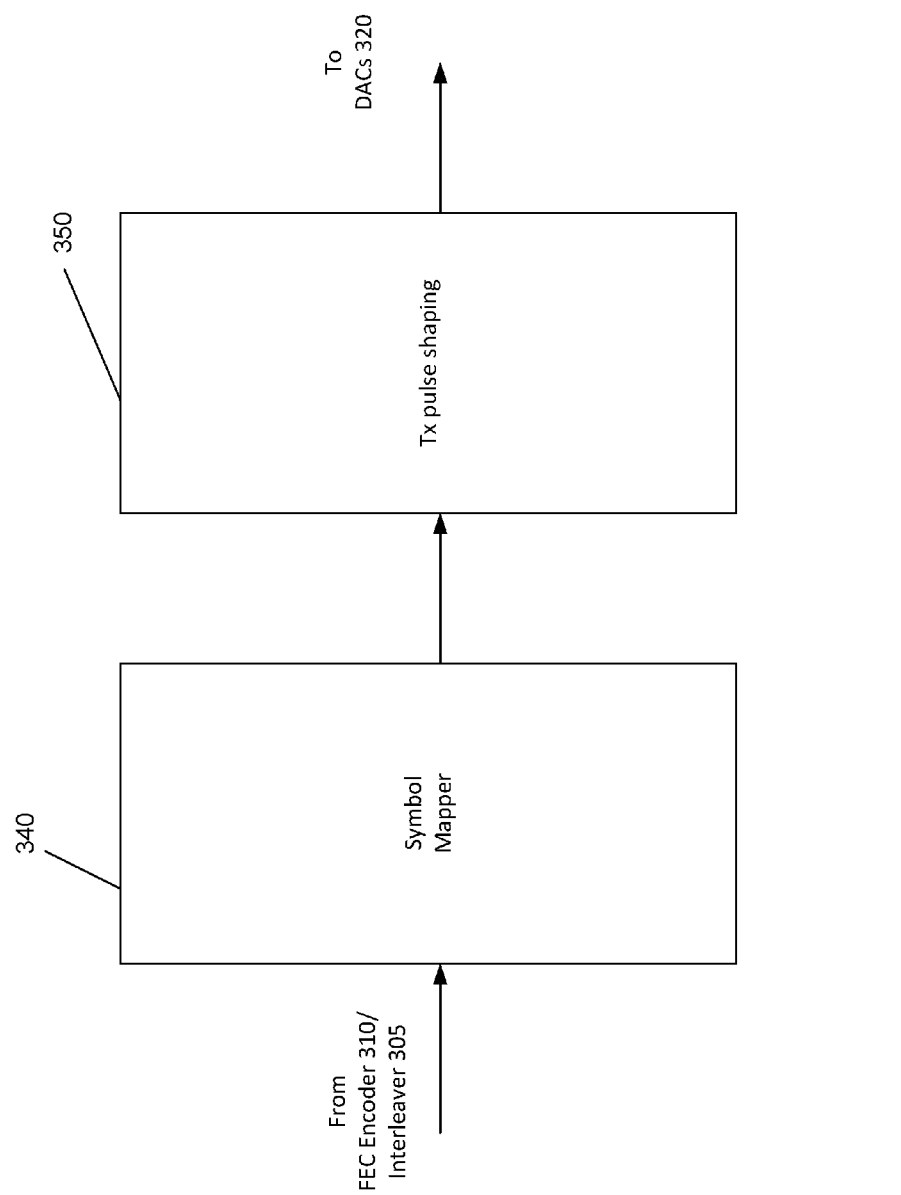
FIG. 3 illustrates example components of a transmitter digital signal processor.

FIG. 3 is a block diagram illustrating certain components of Tx DSP 315. In particular, Tx DSP 315 includes a symbol mapper circuit 340, receives data from encoder 310 or interleaver 305 and supplies digitized signals (mapping signals) based on such inputs to pulse shaping circuit 350. Symbol mapper circuit 340 maps 3 input bits from encoder 310 or interleaver 305 to bits indicative or representative of the phase and amplitude combinations of the output optical signal, which are represented as constellation points in a space. In one example, the space is an IQ plane. In another example, the constellation of points may be in a space that corresponds to phase and amplitude combinations of optical signals in different polarizations, such as transverse electric (TE) and transverse magnetic (TM) polarizations. In a further example, the constellation may be an 8QAM constellation, although other constellations are contemplated.

Symbol mapper circuit 340 may be any one of many type of electronic devices in Tx DSP 315, such as a gate array, programmable logic array (PLA), programmable read only memory (PROM), etc. Alternatively, symbol mapper circuit 340 may be external to Tx DSP 315. The digitized outputs signals of the symbol mapper circuit correspond to the drive signals applied to the modulator to produce the eight unique amplitude/phase combinations that are associated with the eight points of the 8QAM constellation. The 8QAM constellation consistent with the present disclosure will be described in greater detail with respect to FIG. 6B.

As noted above, the digitized signals output from symbol mapper 340 may be provided to Tx pulse shaping circuit 350, which may modify the digitized signals output from symbol mapping circuit 340, so that corresponding drive signals cause the modulators to supply a carved or shaped waveform that has improved tolerance to non-linearities and better spectral efficiency, than without such pulse shaping.

As noted optical signals output from the transmitters 212 are supplied to optical receivers 253, which will now be described in greater detail with respect to FIG. 4. As shown in FIG. 5, optical receiver 253 may include local oscillator (a laser) 510, hybrid mixers or optical hybrid 520, detectors 530, analog-to-digital converters (ADCs) 540, RX digital signal processor (DSP) 550, de-interleaver 560, and/or FEC decoder 570. In some implementations, local oscillator 510, hybrid mixer or optical hybrid 520, and detectors 530 may be implemented on a single integrated circuit, such as a single PIC. In some implementations, ADCs 540 and RX DSP 550 may be implemented using an application specific integrated circuit (ASIC). In some other implementations, local oscillator 510, hybrid mixer 520, and/or detectors 530, may be implemented on one or more PICs.

Local oscillator 510 may include a laser device or a collection of laser devices. In some implementations, local oscillator 510 may provide a reference signal to hybrid mixer 520. In some implementations, local oscillator 510 may include a single-sided laser to provide an optical signal to hybrid mixer 520. In some other implementations, local oscillator 510 may include a double-sided laser to provide multiple optical signals to multiple hybrid mixers 520. In some implementations, a phase, intensity, and/or amplitude of the reference signal may be compared to a phase, intensity, and/or amplitude of an input signal (e.g., a WDM signal supplied by optical demultiplexer 251 and corresponding to an output signal provided by transmitter module 212) to recover data carried by the input signal.

Hybrid mixer 520 may include one or more optical devices to receive an input signal (e.g., a WDM signal supplied by optical demultiplexer 251 and corresponding to an output signal provided by transmitter module 212). In some implementations, hybrid mixer 520 may receive a reference signal from local oscillator 510. In some implementations, hybrid mixer 520 may supply an output optical signal having components associated with the input signal and the reference optical signal to detectors 530. For example, hybrid mixer 520 and detectors 530 may supply an XI component, an XQ component, a YI component, and a YQ component. In some implementations, a first hybrid mixer 520 may provide the XI component and the XQ component, and a second hybrid mixer 520 may provide the YI component and the YQ component.

Detectors 530 may include one or more photodetectors, such as a photodiode, to receive an output optical signal, from hybrid mixer 520, and convert the output optical signal to corresponding voltage signals. In some implementation, optical receiver 253 may include multiple detectors for XI components, XQ components, YI components, and YQ components. In some implementations, detectors 530 may include one or more balanced pairs of photodetectors. For example, detectors 530 may include a first pair of photodetectors to receive an XI component, a second pair of photodetectors to receive an XQ component. Additionally, detectors 530 may include a third pair of photodetectors to receive a YI component and a fourth pair of photodetectors to receive a YQ component.

ADC 540 may include an analog-to-digital converter that converts the voltage signals from detectors 530 to digital signals. ADC 540 may provide the digital signals to RX DSP 550. In some implementations, optical receiver 253 may include four ADCs 540 or some other number of ADCs 540 (e.g., one ADC 540 for each electrical signal output by detectors 530). In some implementations, the digital signals may include samples associated with the input signal. In some implementations, the samples may be provided over XI, XQ, YI, and YQ lanes.

RX DSP 550 may include a digital signal processing device or a collection of digital signal processing devices. In some implementations, RX DSP 550 may receive digital signals from ADC 540 and may process the digital signals (e.g., to reduce phase noise, chromatic dispersion, timing skews, etc., associated with the digital signals introduced during transmission of a corresponding input signal received by hybrid mixer 520 and detectors 530) to form output bits (also referred to as "soft metrics") including data associated with the input signal. Additional details regarding RX DSP 550 are described with respect to FIG. 5.

Optionally, de-interleaver 560 may be provided which includes a bit collection component that receives output bits from RX DSP 550 in groups of fours. In some implementations, de-interleaver 560 may arranges the bits in four (FEC) frames such that first bits, of multiple groups of bits, are provided in a first frame; second bits, of the multiple groups of bits, are provided in a second frame; third bits, of the multiple groups of bits, are provided in a third frame; and fourth bits, of the multiple groups of bits, are provided in a fourth frame. In some implementations, de-interleaver 560 may group the first bits, second bits, third bits, and fourth bits from different groups to prevent bits with errors from being grouped together.

FEC decoder 570 may include a digital decoding device, or a collection of digital decoding devices. In some implementations, FEC decoder 570 may receive grouped bits from de-interleaver 560 and decode the bits using a block code, a convolution code, and/or some other code or technique. In some implementations, FEC decoder 570 may decode the bits to form recovered client data corresponding to client data provided to optical transmitter 212, as described above.

Figure 4:
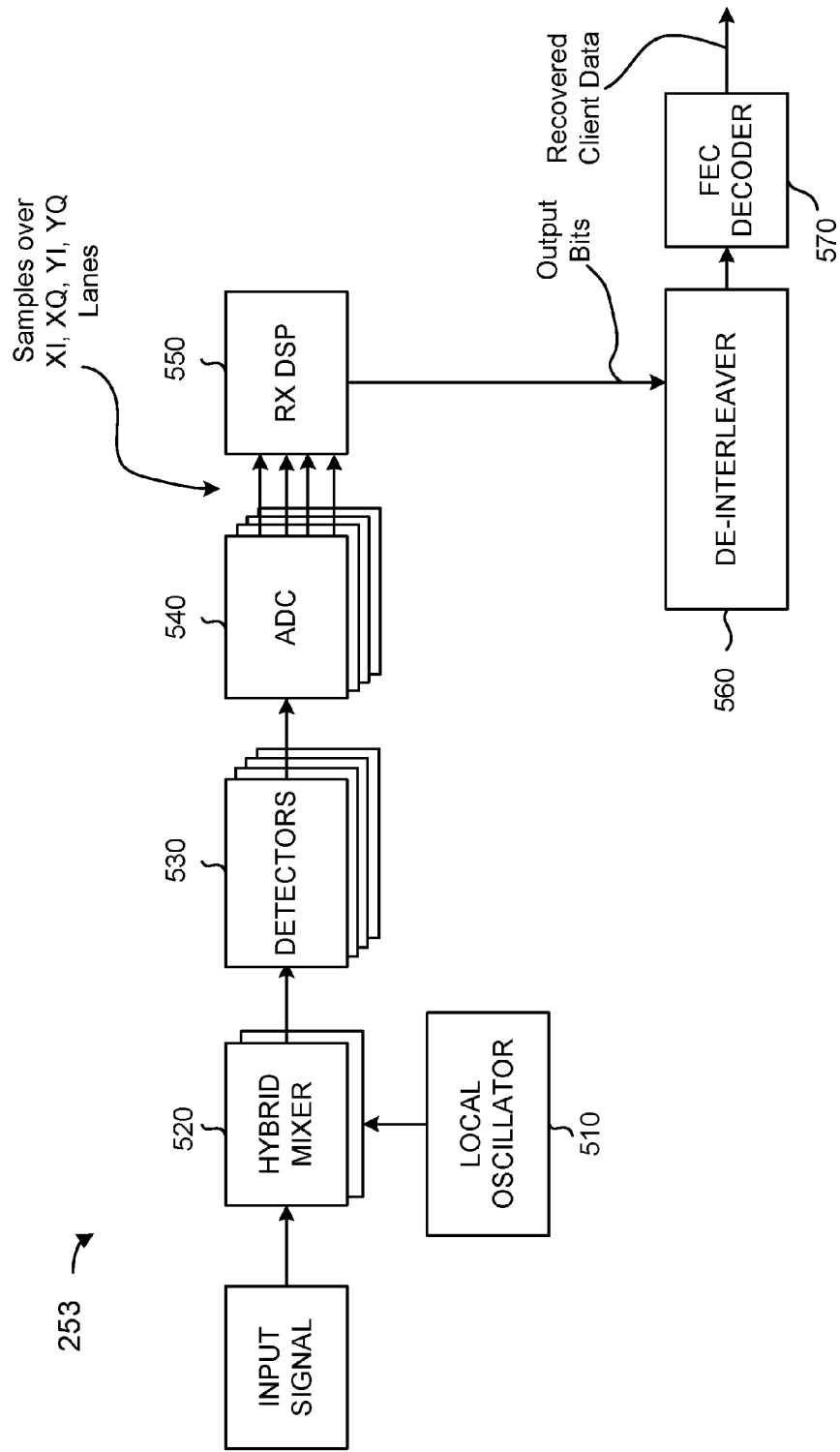
FIG. 4 is a diagram illustrating example components of an optical receiver as shown in FIG. 1.

While FIG. 4 shows optical receiver 253 as including a particular quantity and arrangement of components, in some implementations, optical receiver 253 may include additional components, fewer components, different components, or differently arranged components. For example, optical receiver 253 may include a chromatic dispersion compensating component and/or some other component to compensate for dispersion associated with digital signals provided by ADCs 540.

FIG. 5 illustrates a block diagram of components of Rx DSP 550. Namely, Rx DSP 550 includes a clock and carrier recovery circuit 580, that receives outputs of ADCs 540 and supplies extracted clock information and data to symbol demapper 590. Symbol demapper 590, in turn, associates symbols with the incoming data, and such symbols are then sent to FEC decoder or de-interleaver 560.

Figure 6B:
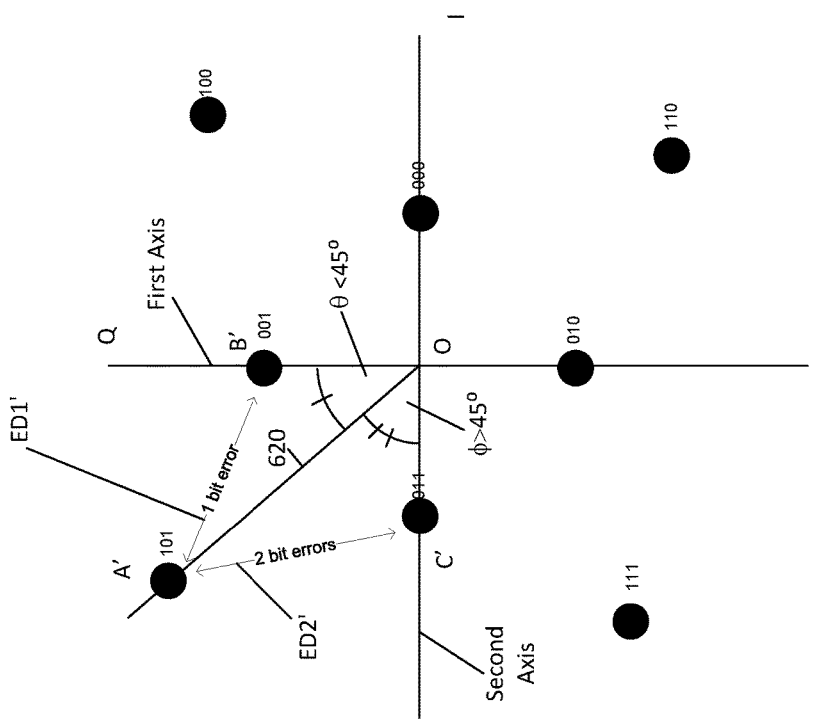
FIGS. 6b and 6c illustrates examples of constellations consistent with the present disclosure.

Further details of symbol mapper 340 and symbol demapper 590 will next be described with reference to FIGS. 6a-6c.

As noted above, symbol mapper circuit 340 receives encoded data from FEC encoder 305 or optionally from interleaver 310. Symbol mapper 340 outputs mapping signals representing constellation points on an IP plane, each of which representing a respective one of a plurality of phase and amplitude combinations of an optical signal. The resulting optical signal is transmitted from one of the optical transmitters noted above to the optical receiver circuit, also discussed above.

Figure 6A:
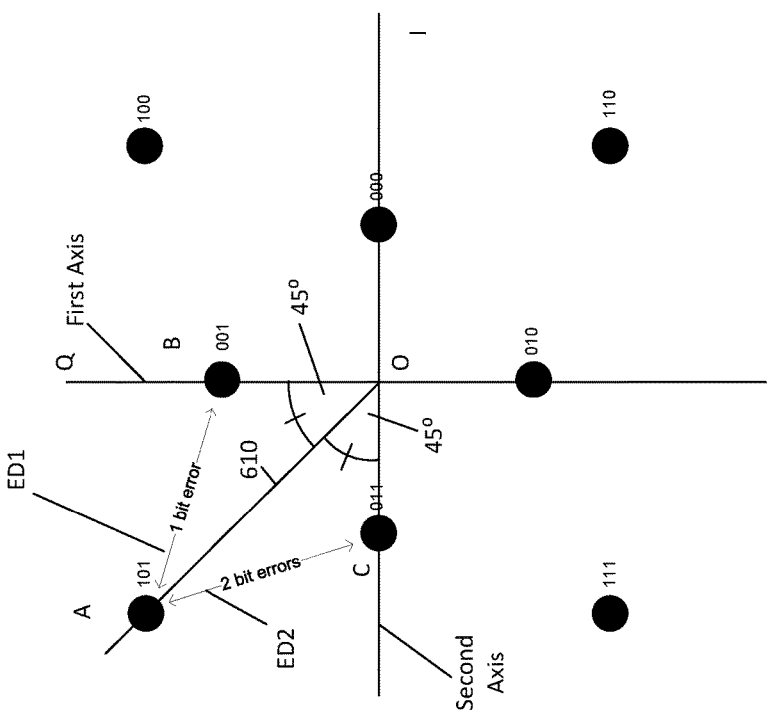
FIG. 6a illustrates an star-8QAM constellation.
Figure 6C:
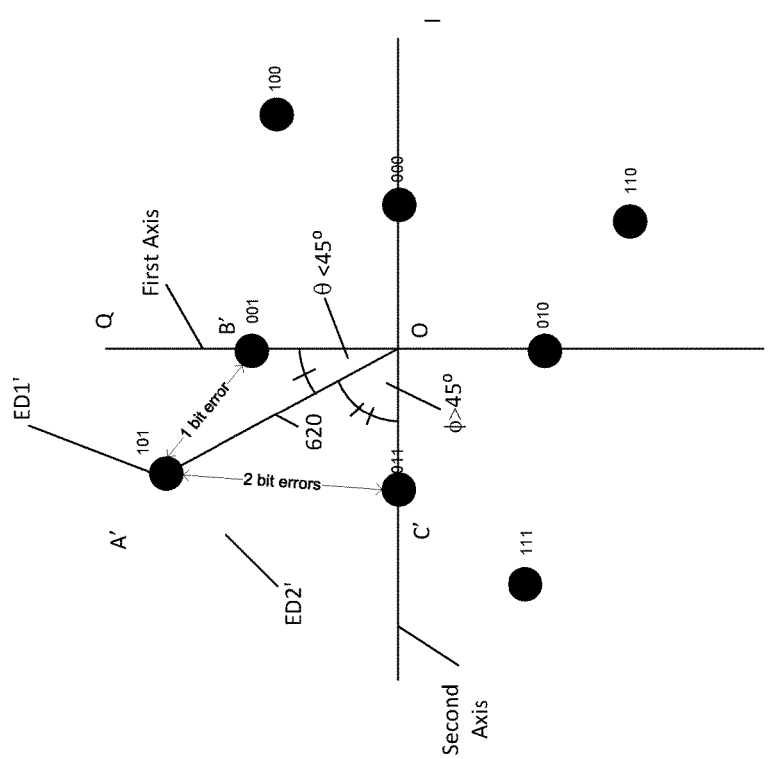

FIG. 6a illustrates a conventional star-8QAM constellation in which outer constellation points (designated by symbols 101, 100, 111, and 110) and inner constellation points (designated by symbols 011, 001, 000, and 010) are symmetric and uniformly distributed about origin O. Put another way, point A (symbol 101) is equidistant to point B (symbol 011) and point C (symbol 001), such that a line 610 defined by point A and origin O forms a 45 degree angle with a first axis defined by point B and the origin, as well as a second axis defined by point C and origin O. The distance between constellation points in a space, such as an IQ plane, may also be referred to as the "Euclidean Distance (ED)".

In one scenario, the transmission of a symbol 101 at point A can, after transmission through a noisy optical link including an optical fiber, for example, result in an erroneous transmission, such that either point B or point C is detected instead of point A. Here, Euclidean Distance ED1 that separates point A from point B in the IQ plane is equal to the Euclidean Distance ED2 that separates point A from point C. Accordingly, a point B "transition" or a point C "transition" can occur with equal probability. Point B transitions, however, involve two bit errors because the symbol represented by point B (011) has two bits different than the symbol represented by point A (101) (see the two-headed arrow labeled "2 bit errors" in FIG. 6a). On the other hand, a point C error, results in only a one bit error, because the symbol represented by point C (001) differs from the symbol represented by point A (101) by only a single bit (see the two-headed arrow labeled "1 bit error" in FIG. 6a). Since the two-bit error has a relatively high likelihood, the overall bit error rate is relatively high.

As shown in FIG. 6b, and consistent with the present disclosure, the outer points of the modified 8QAM constellation are uniformly distributed about origin O, but these points are phase rotated relative to the inner points, such that point A' (symbol 101) is closer to point B' (symbol 001) than to symbol C' (symbol 011)—point A' being closer (has a shorter Euclidean distance) to points B' and C' than remaining points in the constellation. Accordingly, Euclidean distance ED1' that separates point A' from point B' is less than Euclidean distance ED2' that separates point A' from point C'. As shown in FIG. 6b, line 620 defined by point A' (symbol 101) and origin O forms an angle $\theta$ in the IQ plane with a first axis defined by point B' (symbol 001) and origin O that is less than 45 degrees. In addition, line 620 forms an angle $\varphi$ with a second axis defined by point C' and origin O. Angle $\varphi$ is greater than 45 degrees. Accordingly, single (one) bit error transitions between A' and B' are more likely to occur than the two-bit transitions between A' and C' because the Euclidean distance between A' and B' is less than the Euclidean distance between A' and C'. As a result, a lower bit error rate is achieved during transmission of optical signals having phase and amplitude combinations corresponding to points that conform to the 8QAM constellation shown in FIG. 6b, than in connection with the constellation shown in FIG. 6a in which the Euclidean distance between A and B and the Euclidean distance between A and C are the same.

As described above in FIG. 6b, outer constellation points are phase rotated relative to the inner points to reduce the Euclidean distance to the nearest inner one-bit error constellation point. In addition to such phase rotation, the outer points may be subject to amplitude scaling to further reduce the Euclidean distance to the nearest one-bit error inner constellation point. For example, as shown in FIG. 6c, the amplitude of the outer constellation points, that is, the distance such outer constellation points are from the origin O may be scaled or adjusted. The outer points are also phase rotated as discussed above. By combining both amplitude scaling and phase rotation, the BER may be reduced further.

Table 1 (below) shows the results of a simulated transmission of optical signals modulated with the conventional star-8QAM format that an 8QAM modulated signal in which the outer points have been rotated.

TABLE 1

| Configuration | Rate of single-errors | Rate of dual-errors | Net BER |
|---|---|---|---|
| Standard star-8QAM | 3.77% | 1.71% | 2.40% |
| Rotated star-8QAM | 4.94% | 0.90% | 2.24% |

Although the rate of single (one bit) errors is higher for the rotated star 8QAM constellation consistent with the present disclosure, the overall net bit error rate (BER) is less for the rotated 8QAM compared to the conventional or standard star 8QAM. It is noted that although both symbol-wise and bit-wise error correction algorithms exits, bit correction algorithms are more flexible. Accordingly, correction of one bit errors consistent with the present disclosure can be carried with such bit-wise error correction algorithms in the FEC encoder and decoder circuits discussed above. An additional 0.11 dB or noise, in one example, can be tolerated.

Figure 7:
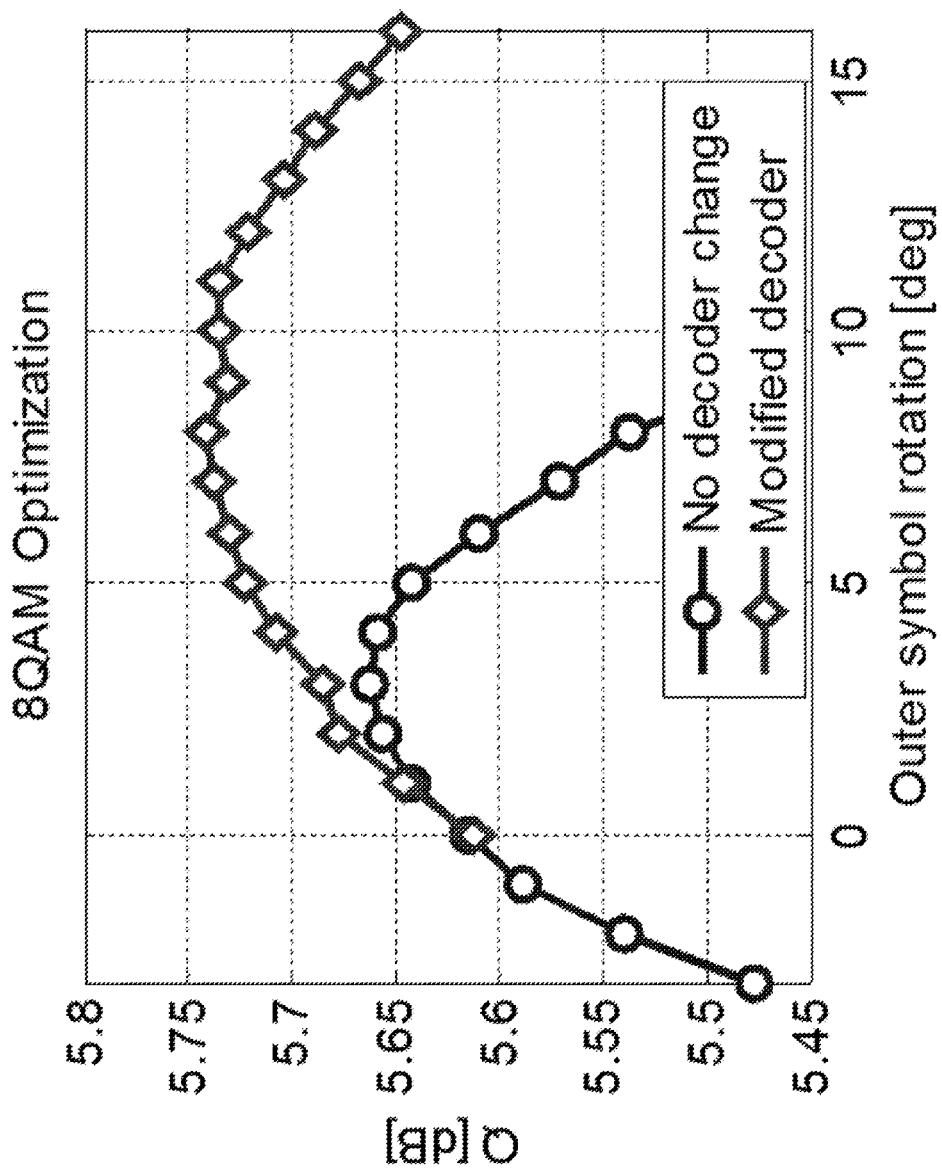
FIG. 7 illustrates plots of Q parameter vs. rotation of constellation points or symbols consistent with the present disclosure.

FIG. 7 illustrates results of a further simulation which measures the effect on the Q parameter (related to bit error rate) and the rotation angle of the outer constellation points. Here the rotation varies from 0 to 15 degrees, which corresponds to angle $\theta$ of 45-30 degrees. As shown in FIG. 7, an improvement in Q values, e.g., higher Q values, were obtained without any change to the decoder. That is, symbol mapper 340 maps the constellation so that the outer points are rotated, as noted above, but symbol demapper 590 is not programmed or adjusted to demap points at the rotated locations. As also shown in FIG. 7, further improvement, i.e., increased Q, can be obtained if the decoder is designed, such that symbol demapper 590 is programmed to expect the rotated outer constellation points, as shown in the curve labeled by "modified decoder." Put another way, symbol demapper 590, in this example, is programmed to demap points at the rotated locations. As generally understood, optical signals having higher Q values have a lower bit error rate than optical signals having lower Q values.

As further shown in FIG. 7 improved Q was observed over a range of rotations between 8 to 13 degrees, which correspond to an angle $\theta$ that is in a range of 32 degrees to 41 degrees. Within that range, the highest Q values were observed with about 8 degrees of rotation, i.e., over an optimal range between 7 to 9 degrees of rotation, which corresponds to $\theta$ in a range of 36 and 38 degrees. Further, improved Q was also observed for angle of rotation between 5 and 10 degrees or angle $\theta$ between 35 degrees and 40 degrees.

Thus, improved performance can be achieved with rotated outer constellation points. Although 8QAM modulation formats and corresponding constellations are described above, the present disclosure also contemplates modulation formats and corresponding constellations having a higher order than that of 8QAM.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
 a forward error correction encoder that receives first data and outputs encoded second data; and
 a mapper circuit that receives the encoded second data and outputs mapping signals representing constellation points in a space, each of the constellation points representing a respective one of a plurality of phase and amplitude combinations of an optical signal, the constellation points including first, second, and third constellation points,
 wherein a first Euclidean distance separates the first constellation point and the second constellation point, and a second Euclidean distance separates the first constellation point from the third constellation point, the first Euclidean distance being less than the second Euclidean distance, and the first and second Euclidean distances being less than Euclidean distances that separate the first constellation point from each of a corresponding one of remaining constellation points other than the second and third constellation points,
 the first, second, and third constellation points corresponding to first, second, and third sequences of bits, respectively, such that the first sequence of bits differs from the second sequence of bits by a single bit, and the first sequence of bits differs from the third sequence of bits by at least two bits, such that a bit error rate associated with the optical signal is less than a bit error rate of the optical signal if the first and second Euclidean distances are equal to one another, wherein a number of the constellation points is eight, such that the optical signal is modulated in accordance with an 8QAM modulation format, wherein the space is an IQ plane having an origin, a first axis extends through the second constellation point and the origin of the IQ plane and a second axis extends through the third constellation point and the origin of the IQ plane, the first constellation and the origin of the IQ plane defines a line, the line forming an angle with the first axis that is in a range of 32 degrees to 41 degrees.

2. An apparatus in accordance with claim 1, wherein the angle is 37 degrees.

3. An apparatus in accordance with claim 1, wherein the apparatus includes a pulse shaping circuit, the mapping signals are supplied to a pulse shaping circuit, which outputs digital drive signals based on the mapping signals.

4. An apparatus in accordance with claim 3, wherein the apparatus includes analog-to-digital conversion circuits, the digital drive signals are supplied to digital-to-analog conversion circuits, and the digital-to-analog conversion circuits supply analog signals based on the digital drive signals.

5. An apparatus in accordance with claim 4, wherein the apparatus includes a modulator and a laser, the analog signals being supplied to the modulator, which receives light from the laser, the modulator outputting the optical signal.

6. An apparatus, comprising:
an optical receiver circuit that receives an optical signal, carrying data; and
a processor circuit coupled to the optical receiver circuit that outputs information associated with the data,
wherein the optical signal is modulated such that the data is represented by constellation points on an IQ plane, each of the constellation points corresponding to a respective one of a plurality of phase and amplitude combinations of an optical signal, the constellation points including first, second, and third constellation points,
wherein a first Euclidean distance separates the first constellation point and the second constellation point, and a second Euclidean distance separates the first constellation point from the third constellation point, the first Euclidean distance being less than the second Euclidean distance, and the first and second Euclidean distances being less than Euclidean distances that separate the first constellation point from each of a corresponding one of remaining constellation points other than the second and third constellation points,
the first, second, and third constellation points corresponding to first, second, and third sequences of bits, respectively, such that the first sequence of bits differs from the second sequence of bits by a single bit, and the first sequence of bits differs from the third sequence of bits by at least two bits, such that a bit error rate associated with the optical signal is less than a bit error rate of the optical signal if the first and second Euclidean distances are equal to one another,
wherein a number of the constellation points is eight, such that the optical signal is modulated in accordance with an 8QAM modulation format,
wherein a first axis extends through the second constellation point and the origin of the IQ axis and a second axis extends through the third constellation point and the origin of the IQ axis, the first constellation and the origin of the IQ axis defines a line, the line forming an angle with the first axis that is in a range of 32 degrees to 41 degrees.

7. An apparatus in accordance with claim 6, wherein the angle is 37 degrees.

8. An apparatus in accordance with claim 6, wherein the optical receiver circuit includes an optical hybrid that receives the optical signal and a local oscillator signal and outputs a plurality of mixing products.

9. An apparatus in accordance with claim 8, wherein the optical receiver circuit includes a plurality of photodiodes, each of which receiving a corresponding one of the plurality of mixing products and generating a plurality of analog electrical signals.

10. An apparatus in accordance with claim 9, further including a plurality of analog-to-digital conversion circuits that convert each of the analog electrical signals to digital signals.

11. An apparatus, comprising:
an optical transmitter that transmits an optical signal; and
an optical receiver that receives the optical signal, which is modulated by circuitry in the optical transmitter such that data carried by the optical signal is represented by constellation points on an IQ plane, each of the constellation points corresponding to a respective one of a plurality of phase and amplitude combinations of the optical signal, the constellation points including first, second, and third constellation points,
wherein a first Euclidean distance separates the first constellation point and the second constellation point, and a second Euclidean distance separates the first constellation point from the third constellation point, the first Euclidean distance being less than the second Euclidean distance, and the first and second Euclidean distances being less than Euclidean distances that separate the first constellation point from each of a corresponding one of remaining constellation points other than the second and third constellation points,
the first, second, and third constellation points corresponding to first, second, and third sequences of bits, respectively, such that the first sequence of bits differs from the second sequence of bits by a single bit, and the first sequence of bits differs from the third sequence of bits by at least two bits, such that a bit error rate associated with the optical signal is less than a bit error rate of the optical signal if the first and second Euclidean distances are equal to one another,
wherein a number of the constellation points is eight, such that the optical signal is modulated in accordance with an 8QAM modulation format,
wherein a first axis extends through the second constellation point and the origin of the IQ axis and a second axis extends through the third constellation point and the origin of the IQ axis, the first constellation and the origin of the IQ axis defines a line, the line forming an angle with the first axis that is in a range of 32 degrees to 41 degrees.

12. An apparatus in accordance with claim 11, wherein the angle is between 36 and 38 degrees.

13. An apparatus in accordance with claim 11, wherein the optical signal is one of a plurality of optical signals output from the optical transmitter, each of the plurality of optical signals having a corresponding one of a plurality of wavelengths.

14. An apparatus in accordance with claim 11, wherein the angle is between 35 degrees and 40 degrees.

* * * * *